United States Patent [19]

Boevink et al.

[11] 4,347,339

[45] Aug. 31, 1982

[54] CATIONIC BLOCK COPOLYMERS

[75] Inventors: Jan E. Boevink, Malabar; Arthur P. Derrick, Sylvania, both of Australia; John A. Moodie, Lisle, Ill.

[73] Assignee: Nalco Chemical Company, Oak Brook, Ill.

[21] Appl. No.: 261,827

[22] Filed: May 8, 1981

[51] Int. Cl.$^3$ .............. C08L 39/04; C08L 57/12; C08L 71/02; C08L 77/06
[52] U.S. Cl. .................. 525/180; 524/521; 525/185; 525/203; 525/217; 525/218; 525/430; 525/523; 525/540
[58] Field of Search .......... 525/180, 185, 203, 217, 525/218, 430, 523, 540; 524/521

[56] References Cited

U.S. PATENT DOCUMENTS

| | | | |
|---|---|---|---|
| 2,926,116 | 2/1960 | Keim . | |
| 3,271,496 | 9/1966 | Michaels | 525/203 |
| 3,558,744 | 1/1971 | Michaels | 525/203 |
| 3,642,572 | 2/1972 | Endres et al. . | |
| 3,679,621 | 7/1972 | Morf et al. . | |
| 3,684,784 | 8/1972 | Marze | 525/217 |
| 3,746,678 | 7/1973 | Dick et al. . | |
| 3,766,156 | 10/1973 | Kine | 525/217 |
| 3,893,885 | 7/1975 | Ziemann et al. . | |
| 3,898,188 | 8/1975 | Rembaum | 525/185 |
| 3,927,242 | 12/1975 | Rembaum | 525/185 |
| 3,947,396 | 3/1976 | Kangas | 525/203 |
| 3,951,921 | 4/1976 | Espy | 525/430 |
| 4,066,494 | 1/1978 | Scharf et al. . | |
| 4,093,605 | 6/1978 | Hoppe | 525/430 |
| 4,102,827 | 7/1978 | Rembaum | 525/185 |
| 4,118,439 | 10/1978 | Marze | 525/203 |
| 4,233,411 | 11/1980 | Ballweber | 525/185 |
| 4,250,299 | 2/1981 | Lehmann et al. . | |
| 4,267,059 | 5/1981 | Behm | 525/430 |
| 4,271,053 | 6/1981 | Kelsey | 525/523 |
| 4,319,008 | 3/1982 | Marze | 525/523 |

*Primary Examiner*—Paul Lieberman
*Attorney, Agent, or Firm*—John G. Premo; Robert A. Miller

[57] ABSTRACT

Water soluble cationic block copolymer comprising at least one first polymer block selected from a first class consisting of polymeric species having amino groups in the polymeric structure thereof wherein a majority of said amino groups are quaternary, and at least one second polymer block selected from a second class consisting of polymer species having amino groups in the polymeric structure thereof wherein a majority of said amino groups are other than quaternary amino acids. Also included are the methods of making these copolymers.

33 Claims, No Drawings

CATIONIC BLOCK COPOLYMERS

This invention relates to water soluble cationic polymers and more particularly to cationic block copolymers and to methods of synthesising them.

Synthetic water soluble cationic polymers have become increasingly important during the past 20–30 years in a wide range of aqueous phase solids/liquid separation processes. Examples of processes in which such cationic polymers have been used include water treatment processes, mining and mineral dressing, the production of paper and board products and treatment of sewerage and general effluent. Such polymers are also used in water-in-oil emulsion treating technology, in biochemical processes, and the like.

Many common industrial and naturally occurring aqueous dispersions, suspensions and colloids carry and may be stabilised by negative charges on the surface of the particulate matter. These negative charges strongly interact with those water soluble polymers which have cationic charges in their molecular structure.

Water soluble cationic polymers are used in mining and mineral dressing to induce coagulation and flocculation of particulate and colloidal matter and to clarify and/or thicken process slurries and effluent streams.

For example low molecular weight polyamines are widely used to coagulate and separate fine clays and shales in tailings thickeners associated with coal washing plants.

They are widely used for the treatment of water supplies from natural sources to assist in the removal of colour, colloidal and suspended matter thus rendering the water suitable for human consumption, or for specialised industrial applications such as dyeing processes.

Cationic polymers are widely used in sewerage treatment to encourage flocculation of solids and also to improve dewatering of raw and treated sludges in centrifuges, filter presses etc.

In the paper industry many and varied cationic and anionic polymers have been developed and extensively used to attain improved retention of filler clays, pigments and fine fibre material in the paper sheet when it is formed from the aqueous stock suspension.

During the manufacture of paper and board certain specifically defined cationic polymers find application in improving the production rate of paper machines by allowing more effective dewatering of the wet sheet in the press section of the machine, as well as improving retention of fine fibre material and clays.

The cationic water soluble polymers that are commercially available or have been suggested for the above applications belong to the following types:

1. Homopolymers such as:
    1.1 P DMAEMA (poly dimethyl amino ethyl methacrylate)
    a straight chain polymer with tertiary amino groups.
    1.2 P DADMAC (polydiallyl-dimethyl ammonium chloride)
    a straight chain polymer with quaternary amino groups in a saturated ring.
    1.3 PEI (polyethyleneimine)
    a branched polymer with mainly secondary and primary but also tertiary amino groups.
    1.4 Polyamidoamines
    a straight chain polymer with mainly secondary amino groups, made by condensation of amines like triethylene tetramine with difunctional carboxylic acids.
2. Copolymers such as:
    2.1 The product of radical polymerisation of an aqueous solution containing both acrylamide and dimethylamino ethyl methacrylate monomer.
    2.2 The product of radical polymerisation of a solution containing both acrylamide and diallyl-dimethyl ammonium chloride.
    2.3 The product of the condensation of epichlorohydrin with dimethylamine and ammonia which product can be described by the approximate formula

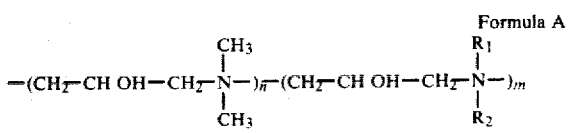

where $R_1$ and $R_2$ can be either H or

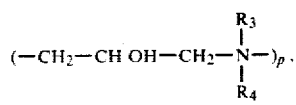

with $R_3$ and $R_4$ mainly equal to $CH_3$ but also possibly equal to H or $R_1$ or $R_2$
    2.4 The product of the condensation of a mixture of diethylene triamine and triethylene tetramine with a dicarboxylic acid (amido-amine with mixed base).
3. Grafted polymers, such as the reaction product of ethylene imine monomer with e.g. amidoamines where ethylene amine and polyethylene imine moieties are attached to the secondary amino group of the primary amido amine backbone.
4. Block copolymers, such as:
    4.1 The reaction product of a polyethylene oxide dihaloydrin with polyethylene imine.
    4.2 The reaction product of polyethylene oxide dihalohydrin with an amido-amine.

The block copolymers of type 4 consist of blocks of polyethylene oxide chains and blocks of cationic polymers containing both primary and secondary amino groups (4.1) or secondary amino groups (4.2). These block copolymers are the subject of extensive patent claims in which the polyethylene oxide block is generally described as having between six and sixty —CH$_2$—CH$_2$—O— groups. The polyethylene oxide block in these block copolymers serves mainly to build larger cationic polymers of the desired type in a predictable manner, but are also claimed to impart novel properties to the resultant block copolymer.

According to preferred embodiments of the present invention, there is provided a new class of water soluble cationic block copolymers which have useful and practical application in processes where synthetic water soluble cationic polymers have been hitherto used. Preferred water soluble cationic block copolymers of the invention may be manufactured at relatively low cost from readily available materials and the performance characteristics of the product of manufacture may be readily controlled.

According to a first aspect the invention consists in a a method of manufacture of a water soluble cationic block copolymer comprising the steps of:

selecting at least one first polymeric species having amino groups in the polymeric structure thereof wherein a majority of the amino groups are quaternary, selecting at least one second polymeric species having amino groups in the polymeric structure thereof wherein a majority of the amino groups are other than quaternary amino groups, and interlinking said selected first and said selected second polymer species to form a block copolymer.

According to a second aspect the invention consists in a water soluble cationic block copolymer comprising at least one first polymer block selected from a first class consisting of polymeric species having amino groups in the polymeric structure thereof wherein a majority of said amino groups are quaternary, and at least one second polymer block selected from a second class consisting of polymer species having amino groups in the polymeric structure thereof wherein a majority of said amino groups are other than quaternary amino groups.

As herein used a "polymer species" comprises a stretch of two or more monomeric units linked together by a chemical bond or bonds.

The two or more monomeric units of a polymer species may be identical monomeric units (homopolymer species) or different monomeric units (copolymer species).

A "polymer block" is a polymer species when linked to at least one different polymer species in a macromolecule. The linkage is by chemical bonding between polymer species or by means of bridging molecules between polymer species.

A "block copolymer" is a macromolecule comprising at least two polymer blocks of which at least one is a polymer species different from at least one other.

The cationic block copolymer of the invention comprises polymer blocks selected from a first class linked with polymer blocks selected from a second class.

The first class comprises polymer blocks having amino groups in the polymeric structure of the block, a majority of which are quaternary.

The second class comprises polymer blocks having amino groups in the polymeric structure of the block of which none, or a minority, are quaternary.

As herein defined a primary amino group may be represented by the formula $RNH_2$, a secondary amino group by the formula $R^I, R^{II}, NH$, a tertiary amino group by the formula $R^I, R^{II}, R^{III}, N$ and a quaternary amino group is $R^I, R^{II}, R^{III}, R^{IV}, N^{30}$ in which $R^I, R^{II}, R^{III}$ and $R^{IV}$ are organic substituents other than hydrogen and may be the same or differ one from another or more than one of them may be parts of one cyclic structure.

The cationic block copolymer of the invention may comprise one or more polymer blocks selected from the first class and one or more of polymer blocks selected from the second class. If there be more than one polymer block of the first class in the cationic block copolymer, then these may be identical or may differ one from the other. Similarly in the event that there is more than one polymer block of the second class in the block copolymer, then these may be identical or different. The polymer blocks selected from the second class preferably have a majority of the amino groups of the polymeric structure thereof which are primary amino or secondary amino groups. However a majority may be a combination of primary and secondary. Less desirably, some of the amino groups of the polymer blocks selected from the second class may be tertiary amino groups. In that event it is preferable that tertiary amino groups be in a minority. In any event, the amino groups of polymer blocks of the second class are either none of them quaternary or a minority of them are quaternary.

Polymer blocks of the first and second class may be linked with bridges of other polymers such as poly ethylene oxide by the use of such compounds as polyethylene oxide dihalohydrin or polyethylene oxide dichloride.

The preferred method of manufacting block copolymers according to the invention is to make use of at least one, and preferably more than one, selected functional groups within the polymeric structure of the first polymer species, that is to say, the component which is characterised in that the amino groups are predominantly quaternary groups. The selected functional group or groups are characterised in that they can be made to react with the primary and/or secondary amino groups of the second polymer species which contains such amino groups and thus serve to connect the first polymer species having predominantly quaternary amino groups with the second polymer species having predominantly primary and/or secondary amino groups.

The preferred functional groups for this purpose are chlorides such as $—CH_2Cl$,

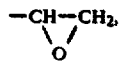

but other functional groups for example bromides, acid anhydrides, aldehydes or isocyanates may also be used.

The component polymer species of which the cationic polymers of this invention are synthesised are typically polymer species of an average molecular weight of between 300–300,000 Dalton units. For preference, each of the component polymer species has an average molecular weight in the range of 1,000–50,000 Dalton units.

The water soluble cationic block copolymers herein described can be readily produced commercially as aqueous solutions with a total polymer solids content of, for example, between 5 and 50% by weight and with a solution viscosity of, for example, between 10 and 10,000 m Pa-sec. In preferred embodiments polymer solids content of the commercial product is between 10 and 30% by weight and solution viscosity between 100 and 1,500 m Pa-sec.

By way of example only, some embodiments of the invention will now be described.

In the examples which follow the abbreviations shown below are used:

| | |
|---|---|
| DAAC | Diallyl-ammonium chloride |
| DADMAC | Diallyl dimethyl ammonium chloride |
| ECH | Epichloro hydrin |
| EG | Ethylene glycol |
| (P) EG | Poly ethylene glycol |
| EDC | Ethylene dichloride |
| DMA | Dimethyl amine |
| EDA | Ethylene diamine |
| PVP | Polyvinyl pyrrolidine |

EXAMPLE 1

Some polymers that can be used as polymeric blocks containing both predominantly quaternary amino groups and functional groups that can react with primary and secondary amino groups are:

1.1 DAAC-DADMAC copolymers (comprising 3–15 mole % DAAC) reacted with ECH, with ECH-DAAC molar ratio 0.9–1.2.

1.2 DAAC-DADMAC copolymer reacted with (P) EG dichlorohydrin ((Poly) ethylene glycol up to PEG 1500) with (P) EG dichlorohydrin-DAAC molar ratio 0.9–1.2.

1.3 DAAC-DADMAC copolymer reacted with PEG dichloride (Polyethylene glycol 100 up to PEG 1500), with PEG dichloride-DAAC molar ratio 0.9–1.2.

1.4 DAAC-DADMAC copolymer reacted with trichlorotriazine, with trichloro-triazine—DAAC molar ratio 0.9–1.2.

1.5 DAAC-DADMAC copolymer reacted with EDC, with EDC-DAAC molar ratio 0.9–1.2.

1.6 ECH-DMA condensation polymer, made by gradually adding ECH to an aqueous solution of DMA, final ECH to DMA molar ratio 1.05 to 1.2

1.7 ECH-DMA-NH$_3$ condensation polymer made by gradually adding ECH to an aqueous solution containing DMA and ammonia (NH$_3$:DMA molar ratio approximately 1:6; ECH-(DMA+NH$_3$) molar ratio approximately 4:7).

1.8 ECH-DMA-EDA condensation polymer made by gradually adding ECH to an aqueous solution containing DMA and ethylene diamine (DMA:EDA molar ratio approximately 1:8; ECH-(DMA+EDA) molar ratio approximately 2:3).

EXAMPLE 2

Some polymers that can be used as blocks with predominantly primary and/or secondary amino groups are:

2.1 The condensation polyamine made by reaction of EDC with ammonia and caustic soda.

2.2 Polyamidoamines, condensation products of a dicarboxylic acid HOOC-(CH$_2$)$_n$—COOH (n=1–4) and a multifunctional amine or mixture of multifunctional amines H$_2$N—(CH$_2$—CH$_2$—NH-)$_m$—CH$_2$—CH$_2$—NH$_2$ (m=0–4, m=0 in mixtures usually is less than 20%)

2.3 DAAC polymer.

2.4 Polyvinyl amine containing a percentage of cyclic ureates such as can be obtained in the Hoffmann degradation of polyacrylamide and described by the general formula

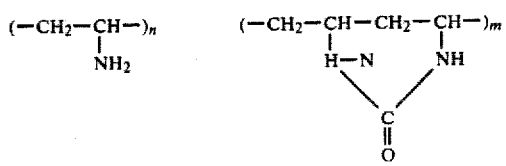

with n:m ratio in the range 1:1 to 200:1.

2.5 Polyvinylpyrrolidine.

EXAMPLE 3

Reaction Conditions

An aqueous solution is prepared with a total content of polymer selected from Examples 1 and 2 of between 5 and 50% and a pH value in the range 7–11, depending on the nature of the functional group. The weight ratio of the first polymeric block selected for example from those listed in Example 1 on the one hand, and the second polymeric block selected for example from those listed in Example 2 on the other hand, may vary in the range 0.05 to 10 depending on the average molecular weight of the respective selected first and selected second polymeric blocks. In the preferred mode of this invention this weight ratio is between 0.3 and 3.

The solution is heated to a temperature in the range 20°–100° C. and kept at this temperature for a period of 0.5–10 hours. In this period the solution is stirred mechanically, the pH value is kept at the desired value through judicious additions of caustic soda and the viscosity of the solution is measured at regular intervals. When a predetermined target viscosity value is achieved acid is added until the ph of the reaction mixture has fallen below pH 5.

Some specific properties of embodiments are summarised in Table 1.

TABLE 1

Conditions used to produce some cationic block copolymers according to the invention.

| A | B$_1$ | B$_2$ | B$_3$ | C$_1$ | C$_2$ | C$_3$ | D | E | F | G | H |
|---|---|---|---|---|---|---|---|---|---|---|---|
| A1 | 1.1* | 5 × 10$^5$ | 10.6 | 2.4** | 3 × 10$^5$ | 15.5 | 7.0–8.5 | 80 | 2 | 300 | — |
| A2 | 1.6 | 2 × 10$^3$ | 6.3 | 2.1 | 8 × 10$^4$ | 18.1 | 7.0–8.5 | 90 | 1 | 182 | 1.9 |
| A3 | 1.7 | 2 × 10$^5$ | 20.8 | 2.1 | 8 × 10$^4$ | 3.0 | 7.5–9 | 90 | 2.5 | 240 | 1.7 |
| A4 | 1.7 | 2 × 10$^5$ | 20.0 | 2.1 | 8 × 10$^4$ | 6.8 | 7–8 | 80 | 1 | 290 | 1.9 |
| A5 | 1.7 | 2 × 10$^5$ | 7.0 | 2.1 | 8 × 10$^4$ | 23.9 | 7–8.5 | 90 | 1.5 | 375 | 2.3 |
| A6 | 1.7 | 2 × 10$^5$ | 20.9 | 2.2*** | 5 × 10$^4$ | 4.3 | 7–9 | 90 | 3 | 245 | 2.0 |
| A7 | 1.7 | 2 × 10$^5$ | 8.6 | 2.2*** | 5 × 10$^4$ | 18.7 | 7–8 | 95 | 3 | 35 | 2.1 |
| A8 | 1.7 | 2 × 10$^5$ | 8.0 | 2.4** | 3 × 10$^5$ | 13.3 | 7–8 | 90 | 2 | 105 | 2.5 |
| A9 | 1.7 | 2 × 10$^5$ | 16.6 | 2.4** | 3 × 10$^5$ | 4.0 | 7.5–8.5 | 95 | 1.5 | 151 | 1.9 |
| A10 | 1.8 | 1 × 10$^4$ | 4.5 | 2.1 | 8 × 10$^4$ | 24.5 | 7.0–8.5 | 80 | 2.5 | 310 | 2.0 |

Column A — Identification of the product cationic block copolymer

Columns B series — Identify the component copolymer with amino groups that are predominately quaternary and

TABLE 1-continued

Conditions used to produce some cationic block copolymers according to the invention.

| | |
|---|---|
| as below | possess functional groups that can react with primary and secondary amino groups. |
| Column $B_1$ | Identifies the type with reference to the numerals of Example 1 above. |
| Column $B_2$ | Indicates the approximate average molecular weight as estimated from viscosity measurements. |
| Column $B_3$ | Indicates the weight percent of the component of Column B with associated anionic counterions present in the reaction mixture. |
| Columns C | Identify the component polymer with amino groups that are predominantly primary and/or secondary |
| Column $C_1$ | Identifies the type with reference to the numerals of Example 2 above. |
| Column $C_2$ | Indicates the approximate average molecular weight as estimated from viscosity measurements. |
| Column $C_3$ | Indicates the weight percent of component C with associated anionic counterions present in the reaction mixture. |
| Column D | Indicates the pH range of the reaction mixture. |
| Column E | Indicates the approximate reaction temperature in degrees C. |
| Column F | Indicates the approximate reaction time in hours. |
| Column G | Indicates the product viscosity after acidification in m.Pa.sec. |
| Column H | Indicates cationic charge density of the product as milliequivalents per gram of product solution |

*DADMAC-DAAC ratio:10.
**This type 2.4 amine polymer had 60–70% of the pendent groups as free amine groups. The value for n:m ratio in Example 2.4 is about 4.
***Adipic-acid-triethylene tetramine condensation amido amine.

EXAMPLE 4

Application of the cationic block copolymers of this invention in the flocculation of clay suspensions. A suspension of kaolin clay in water was made by adding 10 g of fine grade kaolin clay to 1 liter of tap water containing 5 ppm polyacrylate dispersant and mixing for 2 minutes under high shear such as may be obtained in a Waring blender. Three or five 250 ml laboratory measuring cylinders are filled and to two or four of the cylinders dilute solutions of the subject polymers were added and mixed in. The suspensions were allowed to settle for five minutes and the effect of this addition on the clarity of the suspension above the settled material was measured as the absorption of light of 400 nm wavelength in a 1 cm pathlength cell in a laboratory spectrophotometer.

TABLE 2

Effect of various polymers on the settling of a clay slurry of 10g/L.

| Polymer Type With reference Example 1 | Absorption of Supernatant after 5 min. | | | |
|---|---|---|---|---|
| Addition level | 4ppm | 5ppm | 6ppm | 8ppm |
| 1.7 homopolymer | 3.4 | 1.2 | 0.70 | 0.45 |
| 2.1 homopolymer | 5.6 | 4.0 | 2.9 | 2.6 |
| Ratio* 10:1 | — | — | 0.22 | 0.18 |
| Ratio 4:1 | — | — | 0.47 | 0.24 |
| Ratio 2:1 | — | — | 0.39 | 0.23 |
| Ratio 1:1 | 0.96 | 0.61 | 0.47 | 0.24 |
| Ratio 1:2 | 3.8 | 0.69 | 0.20 | 0.18 |

Ratio indicates the ratio of 1.7 moiety compared with the 2.1 moiety in the product block copolymer.

It can be seen from the above that the block copolymers of this invention show their character as a novel class of water soluble polymers, as the homopolymers show very little effect.

EXAMPLE 5

Application of the cationic block copolymers of this invention in the laboratory test simulating the dewatering of a paper web in the press section of a paper machine.

In this test hand sheets are formed from a stock suspension and these handsheets are pressed in a press between TAPPI standard blotter papers using 2 nip loadings and 2 sets of blotter papers.

Moisture content of the pressed handsheet is measured by weighing the sheet before and after drying at 105° C.

Dilute solutions of the subject cationic block copolymers can be mixed into the stock suspension prior to formation of the handsheet.

For each level of polymer addition the procedure of polymer addition, handsheet formation pressing and drying is repeated four times. In the following tabulation only the average of the four measurements is recorded.

Some measurement of the effectiveness of subject cationic block copolymers on retention of fine materials in the handsheet during its formation can be obtained by measuring the absorbance of light of 450 nm wavelength by the filtrate collected during handsheet formation.

Some results are given in Table 3.

As will be immediately apparent to those knowledgeable about paper machine operation and aware of the widespread use of commercial cationic polymeric additives, the results shown in Table 2 show that the cationic block copolymers of this invention constitute a significant advancement of the art of making this class of polymers for use in the paper making process, since lower pressed moisture content and improved retention of fine fibre material are achieved simultaneously with polymers that can be readily prepared from low cost readily available industrial organic chemicals.

TABLE 3

Effect of various cationic block copolymers on fines retention and pressed moisture content in laboratory handsheets

| Stock | Polymer Used | Addition ml of 1% polymer solids solution | Sheet Moisture after pressing % | Filtrate Absorbance in ABS. Units |
|---|---|---|---|---|
| 1 | None | nil | 57.06 | 1.43 |
|  | Commercial PEG Crosslinked polyamido amine | 2.0 | 56.51 | 0.48 |
|  | Example A1 | 2.0 | 56.55 | 0.56 |
|  | Example A5 | 2.0 | 56.27 | 0.49 |
|  | Example A6 | 2.0 | 56.07 | 0.52 |
|  | Example A8 | 2.0 | 56.41 | 0.43 |
|  | Example A9 | 2.0 | 56.07 | 0.55 |
|  | None | nil | 57.13 | 1.26 |
|  | None | nil | 57.25 | 1.35 |
|  | Example A1 | 0.4 | 57.00 | 0.65 |
|  | Example A1 | 0.8 | 56.33 | 0.52 |
|  | Example A1 | 1.2 | 56.66 | 0.44 |
|  | Example A1 | 2.0 | 56.72 | 0.37 |
|  | Commercial PEG Crosslinked Polyamidoamine | 0.8 | 56.99 | 0.45 |
|  | None | nil | 57.42 | 1.48 |
|  | None | nil | 57.23 | 1.42 |
|  | Example A6 | 0.8 | 56.53 | 0.45 |
|  | Example A6 | 1.2 | 56.52 | 0.39 |
|  | Example A9 | 0.8 | 56.75 | 0.55 |
|  | Example A9 | 1.2 | 56.61 | 0.54 |

| pulp stock: | waste paper at 0.38% stock consistency |
| handsheet: | using 500 ml pulp stock |
| forming wire: | fine nylon mesh 10 cm diameter |
| pressing settings: | reproducible for each press operation cycle |
| polymer solution: | diluted to 1% polymer solids |

EXAMPLE 6

Example of the use of one of the subject cationic block copolymers in the manufacture of board.

The machine used in the experiment was a 3 stage inverform machine, width 3.45 m, producing 485 gsm filler board.

In the absence of any dosage of water soluble cationic polymer production aids maximum operating speed on this grade was about 54 meter per minute. With the use of 5 kg per tonne of a commercial PEG-crosslinked polyamidoamine cationic polymer solution* a maximum operating speed of 68 meter per minute could be achieved.

*containing ca 30% by weight polymeric solid material.

With the use of 5 kg per tonne of the polymer of example A4, a maximum operating speed of ca 70 meter per minute could be maintained for a period of one hour, whilst this charge level was maintained.

EXAMPLE 7

Using the same paper machine as in Example 6 above making the same grade of 485 gsm filler board but with a different paper stock.

The commercial PEG crosslinked polyamido amine solution was used at 7 kg per tonne and operating speed was 61 meter per minute. On change-over to the polymer solution of example A10 a speed of 60 meters per minute could be readily maintained. The above example again shows the good performance of the cationic block copolymers of this invention.

Many block copolymers fall within the scope of the invention which have not been specifically exemplified, and block copolymers according to the invention may be synthesised by routes and by use of various reaction conditions which also, to an extent which will be readily apparent to those skilled in the art in the light of the disclosure contained herein, fall within the scope of the invention described.

The claims defining the invention are as follows:

1. A method of manufacture of a water soluble cationic block copolymer comprising the steps of:
   selecting at least one first polymeric species having amino groups in the polymeric structure thereof wherein a majority of the amino groups are quaternary,
   selecting at least one second polymeric species having amino groups in the polymeric structure thereof wherein a majority of the amino groups are other than quaternary amino groups, and
   interlinking said selected first and said selected second polymer species to form a block copolymer.

2. A method according to claim 1 wherein said first polymeric species has a functional group reactive with an amino group of the second polymeric species and said interlinking step is conducted by reaction of said functional group with said amino group of the second polymer species.

3. A method according to claim 1 wherein said selected first polymer block is interlinked with said selected second polymer block by means of a bridging molecule.

4. A method according to claim 3 wherein the bridging molecule is derived from the group comprising polyethylene oxide polymers, polyethylene oxide dihalohydrin and polyethylene oxide dichloride.

5. A method according to any one of the preceding claims wherein the amino groups of the selected first polymeric species are substantially all quaternary.

6. A method according to any one of the preceding claims wherein the amino groups of the selected second polymeric species are substantially all other than quaternary.

7. A method according to any one of the preceding claims wherein a majority of amino groups of the selected second polymeric species are primary and/or secondary amino groups.

8. A method according to any one of claims 1 to 7 wherein the first polymer species selected is a copolymer including diallyl dimethyl ammonium chloride copolymerized with another monomer.

9. A method according to claim 8 wherein the copolymer of the first polymer species is reacted with epichlorhydrin prior to forming the block species.

10. A method according to claim 8 wherein the diallyl copolymer of the first polymer species is reacted with polyethylene glycol dihalo hydrin prior to forming the block copolymer.

11. A method according to any one of claims 1 to 7 wherein the selected first polymer species is a condensation polymer.

12. A method according to claim 11 wherein the condensation polymer is formed by reaction of aqueous dimethylamine and epichlorhydrin.

13. A method according to claim 11 wherein the condensation polymer is formed by reaction of aqueous dimethylamine and ammonia with epichlorhydrin.

14. A method according to claim 11 wherein the condensation polymer is formed by reaction of epichlorhydrin and an aqueous solution of dimethyl amine and ethylene diamine.

15. A method according to any one of the preceding claims wherein the selected second polymer species is a condensation polyamine.

16. A method according to any one of the preceding claims wherein the selected second polymer species is a polyamido amine.

17. A method according to any one of claims 1 to 14 wherein the selected second polymer species is polydiallyl ammonium chloride.

18. A method according to any one of claims 1 to 14 wherein the selected second polymer species is a polyvinyl pyrrolidine or is a polyvinyl amine containing cyclic ureates.

19. A water soluble cationic block copolymer comprising at least one first polymer block selected from a first class consisting of polymeric species having amino groups in the polymeric structure thereof wherein a majority of said amino groups are quaternary, and
  at least one second polymer block selected from a second class consisting of polymer species having amino groups in the polymeric structure thereof wherein a majority of said amino groups are other than quaternary amino groups.

20. A water soluble cationic block copolymer according to claim 19 wherein the majority of amino groups of said at least one second polymer block are primary and/or secondary amino groups.

21. A water soluble cationic block copolymer according to claim 19 wherein the amino groups of said at least one second polymer block are primary and/or secondary amino groups.

22. A water soluble cationic block copolymer according to any one of claims 19 to 21 wherein the amino groups of said at least one first polymer block are substantially all quaternary amino groups.

23. A water soluble cationic copolymer according to any one of claims 19 to 22 wherein said at least one first polymer block is linked to said at least one second polymer block by reaction of a functional group of said first polymer block with an amine group of said second polymer block.

24. A water soluble cationic block copolymer according to any one of claims 19 to 22 wherein said first polymer block is linked to said second polymer blocks through a bridging molecule.

25. A water soluble cationic block copolymer according to claim 24 wherein the bridging molecule is derived from a polyethylene oxide polymeric species.

26. A water soluble cationic block copolymer according to claim 24 wherein said first polymer block is linked to the second polymer block by use of a compound selected from the group comprising polyethylene oxide, dihalohydrin, and polyethylene oxide dichloride.

27. A water soluble cationic block copolymer according to any one of claims 19 to 26 wherein the polymeric species selected from the first class comprises a diallyl ammonium diallyl dimethyl ammonium copolymer.

28. A water soluble cationic block copolymer according to any one of claims 19 to 26 wherein the polymeric species selected from the first class is a condensation polymer.

29. A water soluble cationic block copolymer according to claim 28 wherein the condensation polymer comprises a condensation product of dimethyl amine with another species.

30. A water soluble cationic block copolymer according to claim 28 wherein at least one second polymer block selected comprises a condensation polyamine.

31. A water soluble cationic block copolymer according to claim 3 wherein said condensation polyamine comprises an ethylenedichloride-ammonia polyamine condensation product.

32. A water soluble cationic block copolymer according to claim 28 wherein the at least one second polymer block selected comprises a condensation product of a polyamido amine with another species.

33. A water soluble cationic block copolymer according to any one of claims 19 to 28 wherein each component polymer block has an average molecular weight of from 1000 to 50,000 dalton units.

* * * * *